United States Patent [19]
Hitora

[11] 4,231,078
[45] Oct. 28, 1980

[54] BEAM-ROTARY LAMP
[75] Inventor: Shozo Hitora, Nara, Japan
[73] Assignee: Sasaki Electric Mfg. Co. Ltd., Osaka, Japan
[21] Appl. No.: 781
[22] Filed: Jan. 3, 1979
[51] Int. Cl.³ ............................................. F21V 21/30
[52] U.S. Cl. ..................................................... 362/35
[58] Field of Search .................... 362/35, 269; 340/25, 340/81, 84, 87, 118, 133

[56] References Cited
U.S. PATENT DOCUMENTS

| | | | |
|---|---|---|---|
| 2,814,029 | 11/1957 | McRea | 362/35 X |
| 3,117,302 | 1/1964 | Cardarelli et al. | 362/35 X |
| 3,266,014 | 8/1966 | Leotta | 362/35 X |

FOREIGN PATENT DOCUMENTS

| | | | |
|---|---|---|---|
| 1030715 | 5/1966 | United Kingdom | 340/84 |
| 1197442 | 7/1970 | United Kingdom | 362/35 |

*Primary Examiner*—John Gonzales
*Attorney, Agent, or Firm*—Browdy and Neimark

[57] ABSTRACT

In a beam-rotary lamp which has a reflector revolving around an electric lamp, an improvement is presented herein which is characterized by that a rotor from which the reflector is supported upwardly is pushed downwards against a motor shaft by means of a repelling or attracting force of a magnet plate fixed to the shaft. All parts are mounted in a compact space defined by a base and transparent bowl.

10 Claims, 5 Drawing Figures

BEAM-ROTARY LAMP

BACKGROUND OF THE INVENTION

The present invention relates to a beam-rotary lamp, especially to such a lamp that is set outdoors or on a roof of an emergency vehicle or other vehicle to give out an intermittent warning or decorative light.

There have been some problems or disadvantages in conventional beam-rotary lamp which has a reflector rotating around an electric lamp set at the center of the apparatus. In a kind of the device in which the motor power is conducted via reduction device comprising a gearing mechanism, the noise of gears is great and smooth conduction is apt to be disturbed by vibration of the apparatus or shocks given to the apparatus. Still more, if some teeth of the gears were broken, the apparatus would yield to impossibility of a further operation.

In order to solve said problems, an another kind of the apparatus comprising a limb-driving mechanism instead of the gearings has been proposed. A resilient plate to which the power of motor is conducted, in this case, is forcibly set in contact with the the support shaft of the reflector. However, it is difficult to adjust the resiliency to the optimum and is complicated in the structure causing consequently other troubles.

There has been an another disadvantage in those usual beam-rotary lamps. Namely, the lamp unit comprising the electric lamp and the power unit comprising the motor are voluminously arranged one upon another in a cylindrical housing.

SUMMARY OF THE INVENTION

The object of the present invention is to present a beam-rotary lamp which can be operated smoothly and accurately in spite of any vibration or shock given to it.

The other object is to present a more compact beam-rotary lamp.

The still other object is to provide with a more simply structured beam-rotary lamp which can be easily constructed.

The novel beam-rotary lamp in this invention has a reflector which revolves around an electric lamp, in the same manner as usual. However, a rotor whose periphery is covered with a doughnut-shaped rubber ring is adopted herein. The rotor having the reflector is rotatably supported by an a shaft which supports a lamp socket.

The rubber ring is firmly set in contact with a motor shaft. So, the power is conducted directly by a friction force.

The firm contact is brought about by a magnet plate mounted on the fixed lamp axis. Either a magnetic attraction between the plate and the rotor or a magnetic repelling between the plate and an another magnet plate fixed on the rotor is utilized in the invented apparatus.

It is an another distinctive feature that the abovementioned lamp unit and power unit are mounted side by side on a single base. The base is covered with a transparent globe to form a compact space.

The details and advantages will be understood from the following explanation of embodiments illustrated with the attached drawings.

DETAILED DISCRIPTION OF THE PREFERRED EMBODIMENTS

Figure 1:
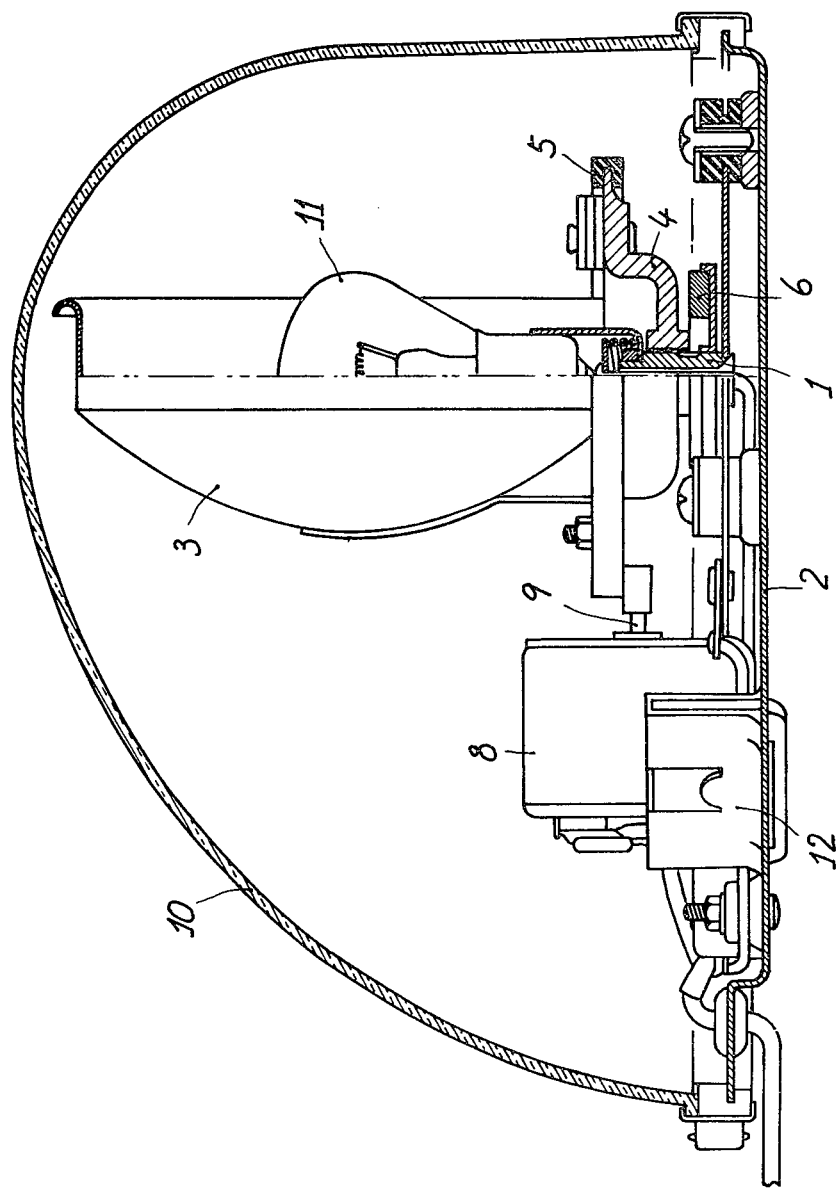
FIG. 1 is a partially cut side elevation of an embodiment.
Figure 2:
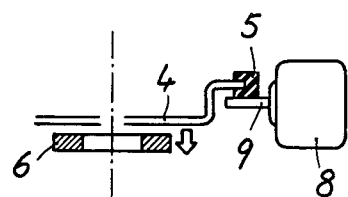
FIG. 2 is a reduced schematic diagram showing the main portion of said embodiment.

As shown in FIG. 1 and FIG. 2 each illustrating an embodiment, a lamp socket supporting shaft 1 is errected and fixed at the front larger portion of an egg-shaped base 2. A reflector 3 is vertically attached to a rotor 4 made of a magnetic substance.

The rotor 4 is supported rotatably by the shaft 1. A doughnut-shaped rubber ring 5 is put on the round periphery of the rotor. A magnet ring 6 surrounding the shaft is immovably mounted below the rotor 4, at a certain distance therefrom.

A motor 8 is set at the rear smaller portion of the base 2. The driving shaft 9 of the motor is brought into contact with the lower surface of the rubber ring 5.

A transparent globe 10 covering the base 2 is bowl-shaped. Therefore an enclosed space is formed with the globe and base 2. The front portion of the globe is wider and higher than the rear portion. The numeral 11 indicates an electric lamp, and the numeral 12 indicates a magnet member which provides a force for removably fixing the base 2 to the top of a vehicle or the like.

In the above embodiment, the rotor 4 made of a magnetic substance is always pulled downwards by the magnet ring 6. Accordingly, the rubber ring 5 of the rotor contacts firmly with the shaft 9 of the motor 8 to conduct the driving force. The reflector 3 is rotated around the lamp 11 by the driving force, scattering an intermittent horizontal ray.

Figure 4:
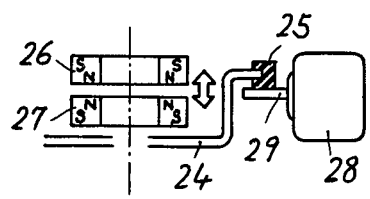
FIG. 4 is a reduced schematic diagram showing the main portion of said another embodiment.
Figure 5:
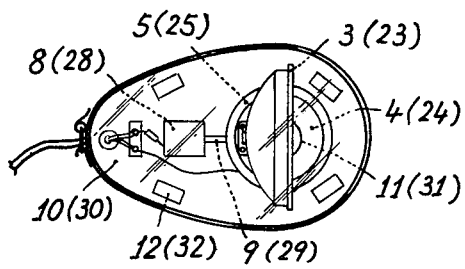
FIG. 5 is a reduced plan view of the both embodiments.
Figure 3:
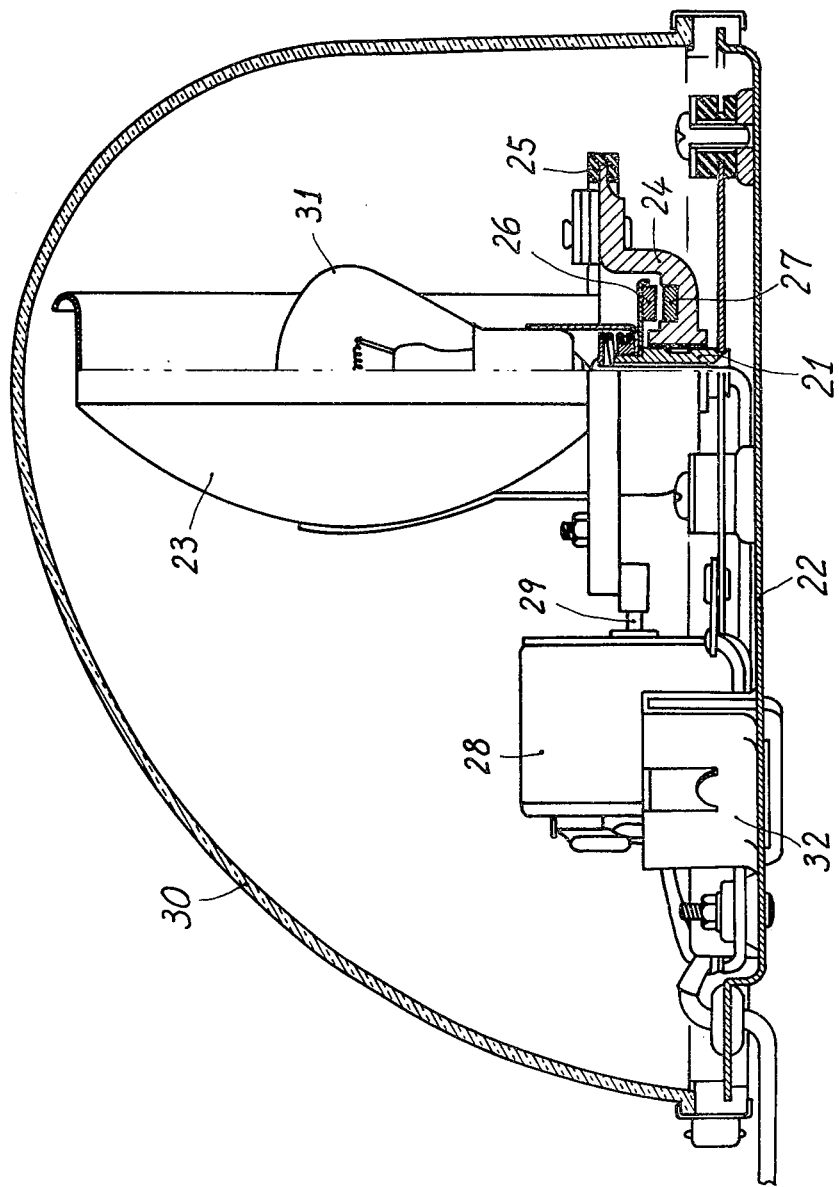
FIG. 3 is a partially cut side elevation of an another embodiment.

An another embodiment of this invention is illustrated in FIG. 3 and FIG. 4.

A lamp supporting shaft 21 supports rotatably a rotor 24 having a reflector 23, in the same manner as in the foregoing embodiment. A rubber ring 25 also is put on the periphery of the rotor 24. However in this embodiment, a pair of magnet rings 26 and 27 is used in the junction portion. The upper ring 26 is immovably fixed to the shaft 21 while the lower ring 27 is attached to the rotor 24. As shown in FIG. 4, the direction of magnetic pole of one magnet ring is opposite to the one of the other magnet ring. Consequently, the latter is always repelled downwards by the former.

The power of motor 28 is similarly conducted to the rotor 24 via the shaft 29 and the rubber ring 25.

A base 22 and a transparent globe 30 are the same as those in the first embodiment, and the numeral 31 indicates an electric lamp, and the numeral 32 indicates a magnet member which provides a force for removably fixing the base 2 to the top of a vehicle or the like.

It should be noted that the both magnet rings 26 and 27 would contract one another with so excessive strong force that an undesirable strong braking action would be applied to the rotor 24 if the both were hypothetically arranged in the same magnetic pole direction. On the contrary, the two magnet rings 26 and 27 are faced invention in opposite polar direction in this invention embodiment that they repell one another and the rotor 24 revolves lightly and smoothly at all times.

The present invention is not restricted to the above embodiments but can be modified in various modes within the scope and spirit of invention declared in claims.

The base and globe, for instance, can be formed respectively into circular and cylindrical shape in such a case that a smaller motor is mounted under the rotor.

In the latter embodiment, the magnet rings 26 and 27 might be mounted under the rotor 24. The motor shaft 29 will, in this case, come into contact with the upper surface of the rubber ring 25. The ring 27 is set above the fixed ring 26 and repelled upwards, and the power coupling will be similarly performed as in the embodiment of FIGS. 3 and 4.

Also in the former embodiment, the change of the relative position of the magnet ring 6 is possible.

The benefits and advantages of this invention are as follows.

The conduction of driving force is always kept secure against any undesirable condition such as inclining, turning upside down or shaking of the apparatus. Even these disordering influences can not cause a slippage or disengagement in the power conduction mechanism.

Other advantages are simplicity in the structure, an easiness in manufacturing, a freedom from troubles and a reduced noise in operation.

What is claimed is:

1. A beam-rotary lamp comprising a base; a transparent globe supported on said base and defining therewith an enclosed space; a motor having a driving shaft, said motor being housed within said enclosed space; a support shaft carrying a lamp socket within said enclosed space; a rotor rotatably supported on said support shaft within said enclosed space and having a periphery; a resilient ring positioned about said periphery of said rotor adjacent said driving shaft of said motor; a reflector positioned on said rotor to rotate therewith; at least one magnetic means fixedly attached to said support shaft for providing a magnetic force to bring said resilient ring into firm frictional contact with said driving shaft of said motor.

2. A beam-rotary lamp in accordance with claim 1, wherein said rotor is a magnetic substance and said magnetic means is positioned close to said rotor.

3. A beam-rotary lamp in accordance with claim 1 or claim 2, wherein said magnetic means comprises a ring magnet positioned above said rotor.

4. A beam-rotary lamp in accordance with claim 1 or claim 2, wherein said magnetic means comprises a ring magnet positioned beneath said rotor.

5. A beam-rotary lamp in accordance with claim 1, wherein said magnetic means comprises a magnet attached to said support shaft, and including an additional magnet attached to said rotor, said magnets being positioned close to and opposite one another.

6. A beam-rotary lamp in accordance with claim 5, wherein said magnets are respective ring magnets.

7. A beam-rotary lamp in accordance with claim 5 or 6, wherein both of said magnets are positioned above said rotor.

8. A beam-rotary lamp in accordance with claim 5 or 6, wherein both of said magnets are positioned below said rotor.

9. A beam-rotary lamp in accordance with claim 1 or claim 2, wherein said base is egg-shaped and said globe is a bowl of corresponding cross section.

10. A beam-rotary lamp in accordance with claim 1 or claim 2, wherein said base is of substantially circular shape and the globe is of substantially corresponding cross section.

* * * * *